United States Patent [19]

Enomoto

[11] Patent Number: 5,761,393
[45] Date of Patent: Jun. 2, 1998

[54] VIDEO PRINTER AND PRINTING METHOD

[75] Inventor: Hisashi Enomoto, Saitama, Japan

[73] Assignee: Fuji Photo Film Co., Ltd., Kanagawa, Japan

[21] Appl. No.: 641,176

[22] Filed: Apr. 30, 1996

[30] Foreign Application Priority Data

May 1, 1995 [JP] Japan ................ 7-107441

[51] Int. Cl.$^6$ .................... G06F 15/00; H04N 1/41; H04N 1/04; H04N 5/225
[52] U.S. Cl. ................ 395/109; 358/428; 358/429; 358/443; 358/448; 358/479; 348/220; 348/395; 348/402; 348/405
[58] Field of Search ................ 395/109, 107, 395/115, 116, 113; 358/479, 428, 443, 448, 429; 348/220, 231, 395, 402, 405, 626, 651

[56] References Cited

U.S. PATENT DOCUMENTS

| | | | |
|---|---|---|---|
| 4,170,785 | 10/1979 | Yoshida et al. | 348/626 |
| 5,294,974 | 3/1994 | Naimpally et al. | 348/405 |
| 5,325,125 | 6/1994 | Naimpally et al. | 348/402 |
| 5,452,403 | 9/1995 | Miller | 395/109 |
| 5,499,060 | 3/1996 | Gove et al. | 348/651 |

*Primary Examiner*—Edward L. Coles, Sr.
*Assistant Examiner*—Mark Wallerson

[57] ABSTRACT

A direct color thermal printer is used with color thermosensitive recording sheet (23), and prints a pixel (i, j) to it in accordance with 8-bit digital data g(i, j), namely brightness data (Y) and chrominance data (R-Y, B-Y). The digital data is compensated by use of a second-order differential operator. An integer 128 is added to the digital data g'(i, j) being compensated. A sum of 128 and the compensated digital data is limited to a range of nine bits, so as to heighten halftone of the pixel to be printed.

27 Claims, 4 Drawing Sheets

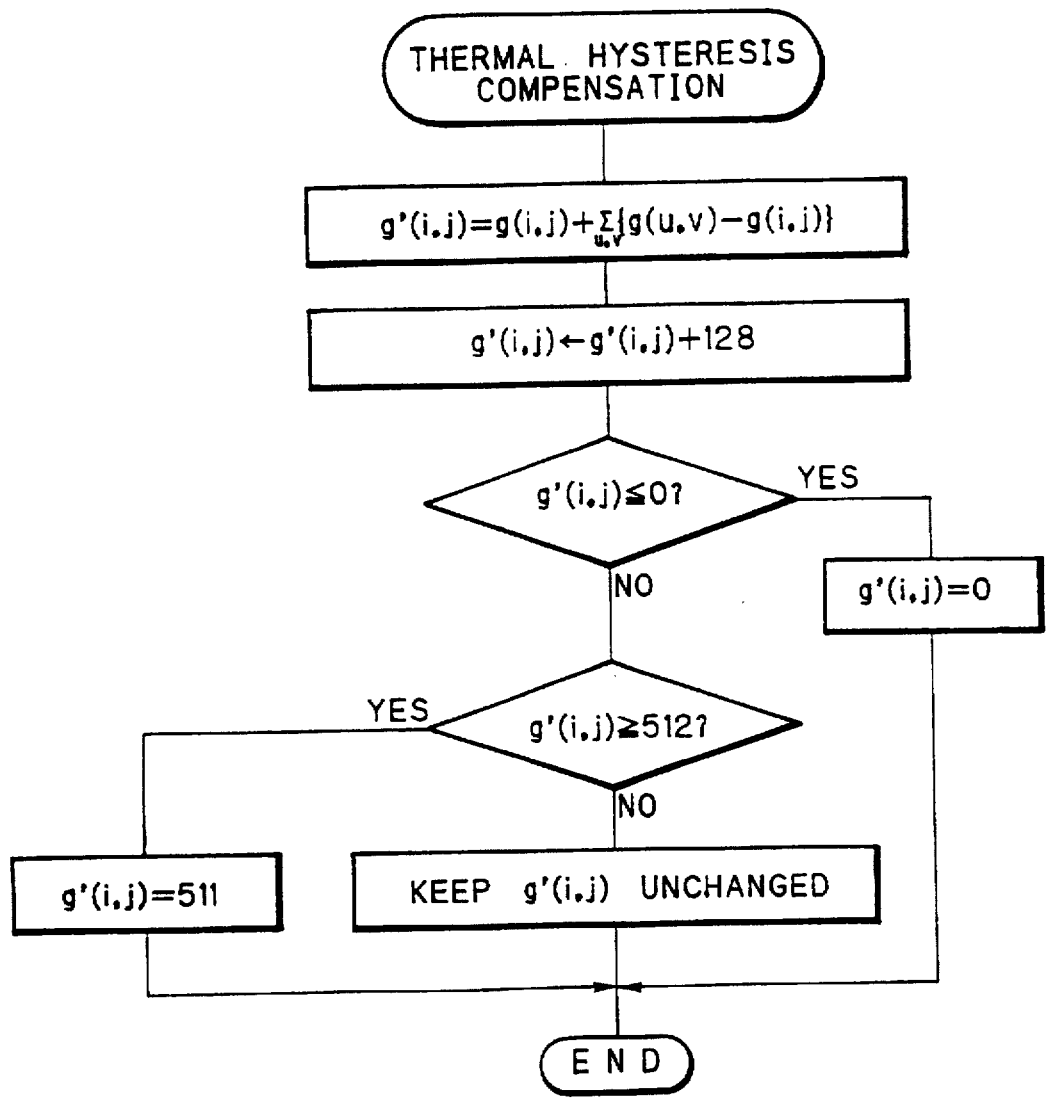

VIDEO PRINTER AND PRINTING METHOD

BACKGROUND OF THE INVENTION

1. Field of the Invention

The present invention relates to a video printer and printing method. More particularly, the present invention relates to a video printer and printing method in which an image can be sharply recorded by effectively reducing influence of one recording element to another in a recording head.

2. Description Related to the Prior Art

A video printer produces a halftone hard copy from a video image. Examples or video printers are a direct thermal printer and a wax-transfer (melt-type) thermal printer. The direct thermal printer is used with a thermosensitive recording material, which has thermally colorable and photochemically fixable characteristics, and includes a support, at least one coloring layer and a protective layer formed in the order listed. A thermal head inclusive of linearly arranged heating elements is moved relatively to the recording material, and applies heat energy thereto in accordance with image data. In the color wax-transfer (melt-type) thermal printer, a color thermosensitive ink sheet is used and which transfers ink to a recording paper.

To print an image including a great number of thin stripes arranged with a fine interval, for example, driven ones of heating elements in the thermal printer generates heat affecting undriven ones of the heating elements. The undriven heating elements are rendered hotter and develop unwanted color in interval portions between the stripes in the recording material, to heighten recording density. There is a problem in low contrast and low sharpness of a recorded image. In view of this, there is a technique for effecting compensating calculation of image data of one heating element to be driven in consideration of image data of heating elements located around the one heating element.

The drive circuit drives the thermal head within a range between a maximum and a minimum of a halftone level. If the drive circuit has 8 bits, heat energy is generated in a range of 256 steps from zero to 255. Even with the above-mentioned compensating calculation, a compensating amount inevitably rises at a portion where the density is abruptly changed. It is likely that the image data is saturated completely and cannot be compensated. If a result of the calculation is over the maximum recordable halftone level, the result must be shifted down to the maximum, and if a result of the calculation is under the minimum recordable halftone level, the result must be shifted up to the minimum. The problem remains in the low sharpness in the recorded image due to influences of thermal hysteresis of the thermal head.

SUMMARY OF THE INVENTION

In view of the foregoing problems, an object of the present invention is to provide a video printer and printing method in which an image can be sharply recorded by effectively reducing influence of one recording element to another in a recording head.

Another object of the present invention is to provide a thermal printer and printing method in which an image can be sharply recorded by effectively reducing influence of thermal hysteresis in compensation of heat.

In order to achieve the above and other objects and advantages of this invention, digital data is quantized in K bits, where K is an integer. The digital data is compensated by use of a second-order differential operator. N is added to the digital data being compensated, where N is an integer. A sum of N and the compensated digital data is limited to a range of (K+L) bits, so as to heighten halftone of the pixel to be printed, where L<K. For example, K=8, and L=1.

According to a preferred embodiment, in the limiting step, if the sum of N and the compensated digital data is smaller than zero, then zero is set in place of the sum. If the sum is greater than $2^{K+L}-1$, then $2^{K+L}-1$ is set in place of the sum.

The compensated digital data g'(i, j) is determined in approximation by:

$$g'(i,j) = g(i,j) + \sum_{u,v} \{g(u,v) - g(i,j)\}$$

where g(i, j) is the digital data of the pixel to be compensated, and g(u, v) is digital data of each of plural pixels located about the pixel to be compensated. Preferably $N \geq 2^{K-1}$.

BRIEF DESCRIPTION OF THE DRAWINGS

The above objects and advantages of the present invention will become more apparent from the following detailed description when read in connection with the accompanying drawings, in which:

FIG. 2 is a flow chart illustrating a process of compensation of thermal hysteresis;

DETAILED DESCRIPTION OF THE PREFERRED EMBODIMENT(S) OF THE PRESENT INVENTION

Figure 1:
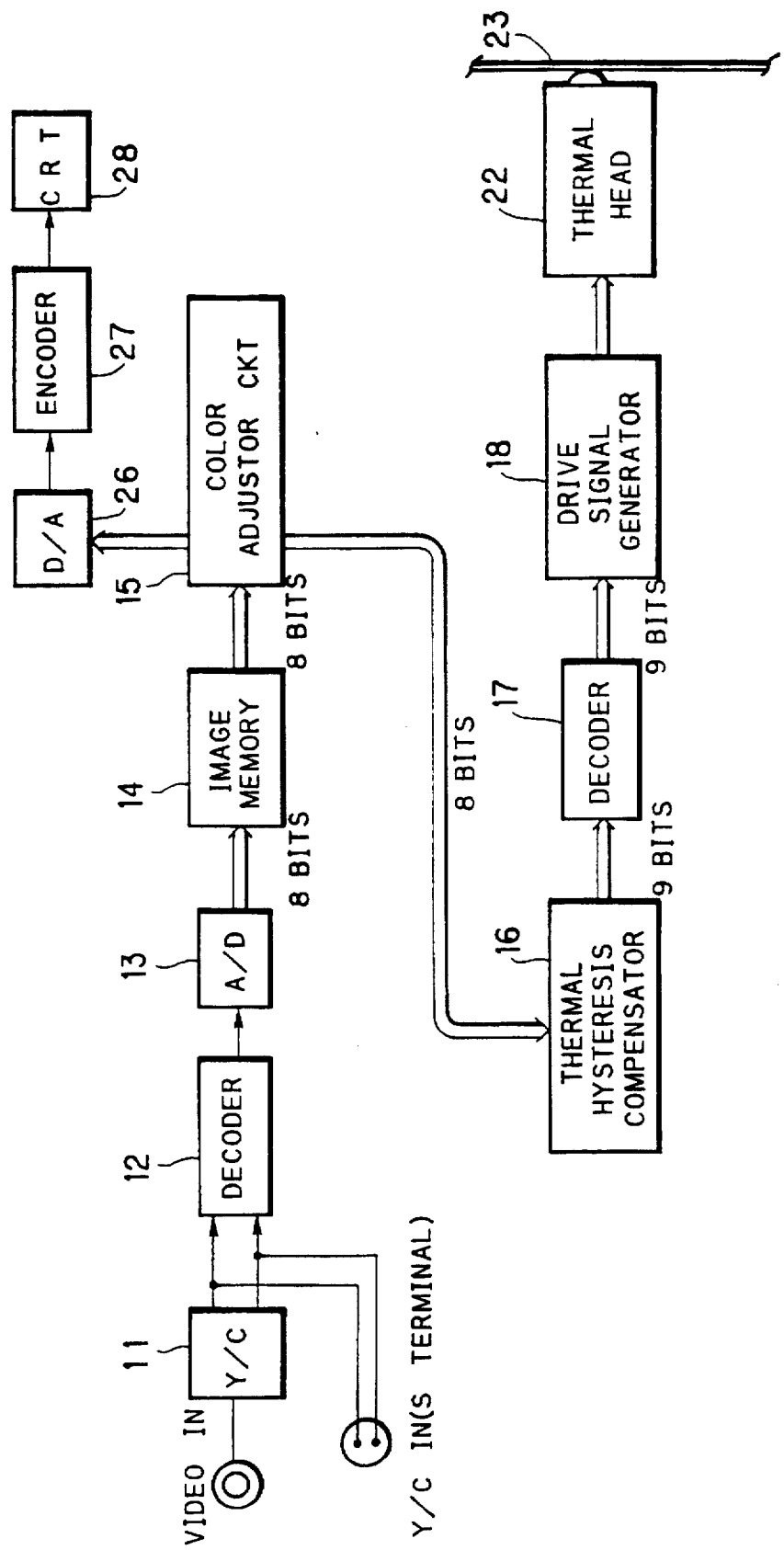
FIG. 1 is a block diagram illustrating a thermal printer.

In FIG. 1, a flexible magnetic disk is set into a still video player, after having recorded image into the flexible disk in an electronic still camera. A video signal played in the video player is input to a Y/C separator circuit 11, which separates it into luminance or brightness signal Y and a color signal C. A decoder 12 converts the color signal C into chrominance signals or color difference signals R-Y and B-Y. The brightness signal Y and the chrominance signals R-Y and B-Y are quantized by an A/D converter 13 and converted into 8-bit digital data to represent 256 steps of gradation. The digital forms of the brightness data Y' and the chrominance data R'-Y' and B'-Y' are written to an image memory 14. Afterwards the brightness data Y' and the chrominance data R'-Y' and B'-Y' are read from the image memory 14, input to a color adjustor circuit 15, where they are subjected to color correction.

Figure 2A:
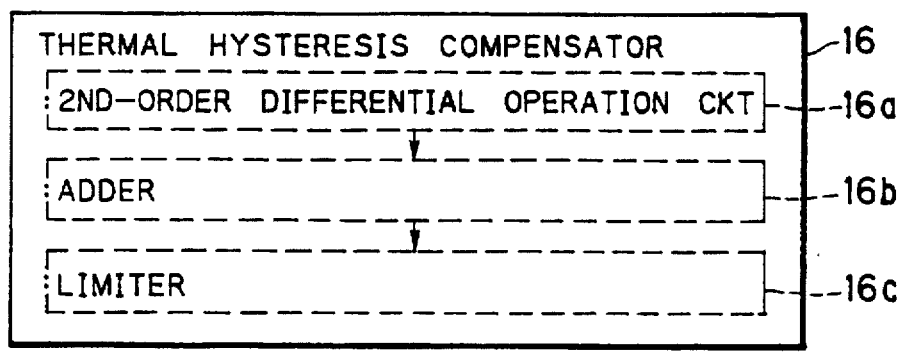
FIG. 2A is a block diagram illustrating a thermal hysteresis compensator.
Figure 2B:
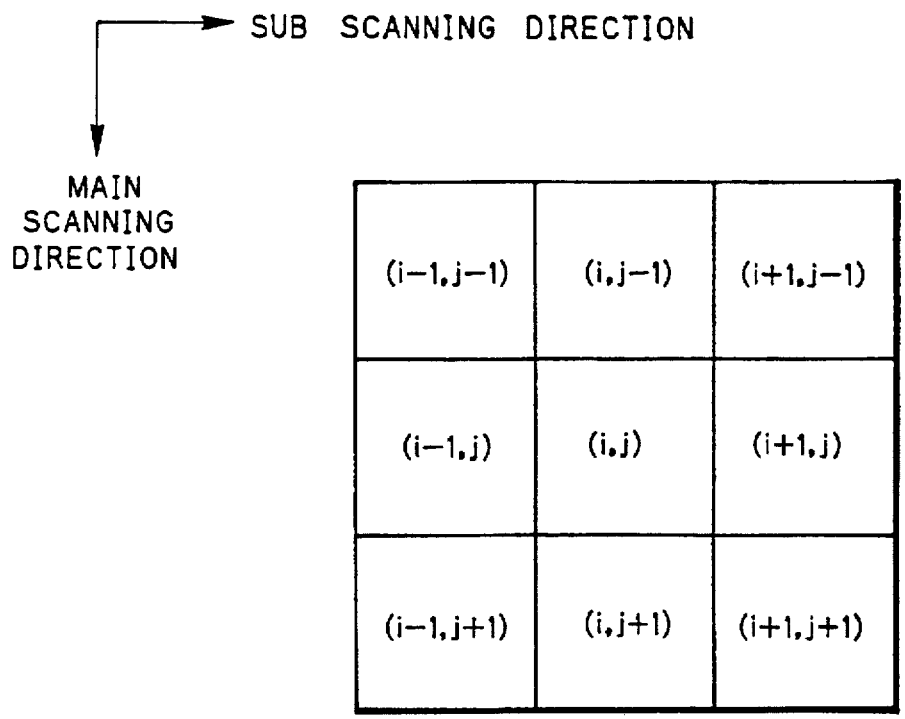
FIG. 2B is an explanatory view illustrating pixels on a thermosensitive recording sheet.

The brightness data Y' and the chrominance data R'-Y' and B'-Y' are input from the color adjustor circuit 15 to a thermal hysteresis compensator 16, in which a second-order differential operation circuit 16a (See FIG. 2A) effects compensating calculation according to a sequence illustrated in FIG. 2, by use of an approximating formula (digital Laplacian) of a second-order differential operator (Laplacian):

$$g'(i,j) = g(i,j) + \sum_{u,v} \{g(u,v) - g(i,j)\}$$

where g(i, j) is a halftone level of a pixel (i, j) in FIG. 2B, and g(u, v) is a halftone level of each of pixels (u, v) which are located about the pixel (i, j), and for example include eight pixels. On the right side of the equation, differences of the halftone level g(u, v) from the halftone level g(i, j) are added up, and added to the halftone level g(i, j). The pixel (i, j) is enhanced in consideration of the pixels (u, v).

In an adder 16b, the halftone level of each pixel after compensating calculation is added to a constant 128, which is 256/2. Then the sum is evaluated in a limiter 16c: if the halftone level is zero or less, then zero is set as halftone level of the pixel, and if the halftone level is 511 or more, then 511 is set as halftone level of the pixel, and if the halftone level is between zero and 511 inclusive, then the halftone level is kept the same. Accordingly the brightness data Y' and the chrominance data R'-Y' and B'-Y' are converted from the 256 steps to 512 steps of the halftone, namely from eight bits to nine bits. Detailed description follows referring to FIG. 4.

Figure 3:
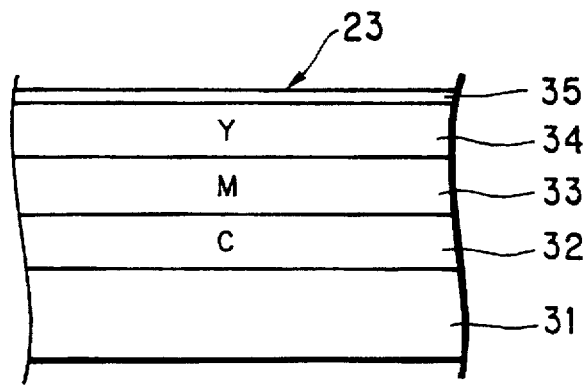
FIG. 3 is an explanatory view illustrating a layered structure of the recording sheet.
Figure 4:
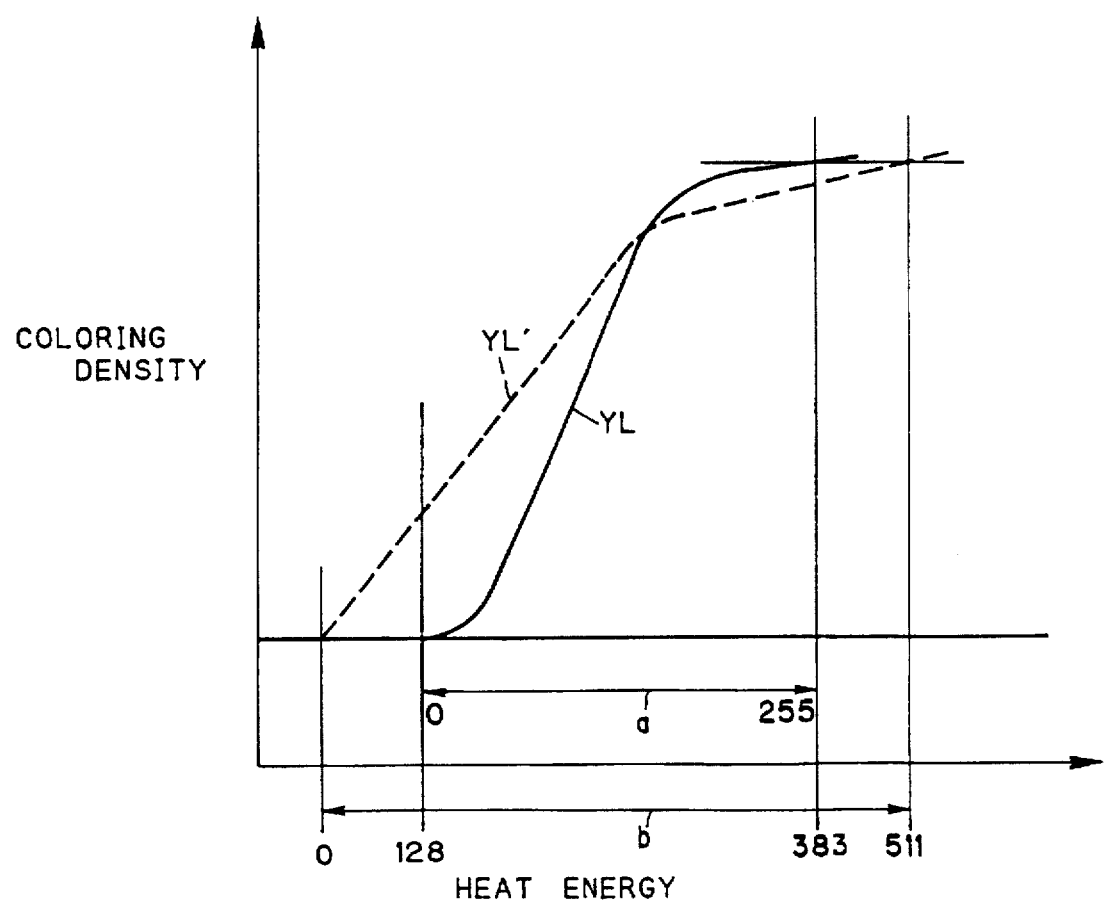
FIG. 4 is a graph illustrating curves YL and YL' of yellow coloring density in connection with 8-bit and 9-bit image data.

In FIG. 4, a curve YL indicated by the solid line is formed by heat application to a yellow thermosensitive coloring layer 34 (See FIG. 3) with 8-bit drive data from a level zero to a level 255 of the halftone. A width of heat energy applied to the yellow coloring layer 34 through one certain heating element is 256 steps. In accordance with the curve YL, if the halftone level becomes −10 or 260 for example after the compensation in the second-order differential operation, the image data is saturated to render the compensation nearly ineffective. It is inevitable that a recorded image is unsharp.

A curve YL' indicated by the broken line is formed by heating the yellow coloring layer 34 with 9-bit drive data which is produced by the above-described conversion of the addition and limitation to the compensated drive data. A width b of the heat energy is determined by spreading the width a in both directions. The yellow coloring layer 34 is colored in a range from level zero to level 511. Note that level 128 in the 9 bits corresponds to level zero in the 8 bits. A pulse width of the head drive signal is changed so as to generate heat energy equally to a halftone level in the 8 bits.

The brightness data Y' and the chrominance data R'-Y' and B'-Y' from the thermal hysteresis compensator 16 are converted by a decoder 17 into three primary-color signals of yellow, magenta and cyan. The three color signals are converted by a drive signal generator 18 into a head drive signal for driving heating elements of a thermal head 22. The drive signal generator 18 has an 8-bit input, and adapted to generation of heat energy of 512 steps from level zero to level 511. The head drive signals of yellow, magenta and cyan respectively drive the thermal head 22. At first, the yellow head drive signal of one frame is supplied to the thermal head 22 line after line, to drive the thermal head 22, which applies heat to the yellow coloring layer in a thermosensitive recording sheet 23, so that a yellow image is recorded line after line. A portion with the yellow image recorded is moved to a position under a yellow fixing lamp, which applies ultraviolet rays to the yellow portion to fix it.

The recording sheet 23 is mounted on a platen for example. After fixing the yellow image, the recording sheet 23 comes to a position under the thermal head 22. A magenta image starts being recorded. The magenta head drive signal of one frame is supplied to the thermal head 22 line after line. A magenta image is recorded one line after another. A magenta fixing lamp applies ultraviolet rays to fix the magenta portion. Finally the cyan head drive signal causes the thermal head 22 to record a cyan image one line after another. As is known in the field of thermal recording, the thermal head 22 consists of a great number of heating elements arranged linearly in a main scanning direction (See FIG. 2B).

Note that the image to be printed is displayed on a CRT (cathode ray tube) 28 after the color adjustment through the color adjustor circuit 15 and conversion in a D/A converter 26 and an encoder 27. It is possible to effect printing while observing the simulated image.

FIG. 3 is referred to now. The recording sheet 23 includes a support 31, a cyan coloring layer 32, a magenta coloring layer 33, the yellow coloring layer 34 and a protective layer 35 formed in the order listed. The support 31 is for example opaque coated paper or plastic film. The coloring layers 32–34 are colored one layer after another in the order from the obverse to the support 31. The cyan coloring layer 32 contains an electron donating dye precursor and an electron accepting compound as main components, and is colored in cyan when it is heated.

The magenta coloring layer 33 contains a diazonium salt compound having a maximum absorbing wavelength of approximately 365 nm, and a coupler which thermally acts upon the diazonium salt compound and is colored in magenta. When the magenta coloring layer 33 receives application of ultraviolet rays of nearly 365 nm after thermal recording through the thermal head 22, the diazonium salt compound of the magenta coloring layer 33 is photochemically decomposed and loses its color developability.

The yellow coloring layer 34 contains a diazonium salt compound having a maximum absorbing wavelength of approximately 420 nm, and a coupler which thermally acts upon the diazonium salt compound and is colored in yellow. When the yellow coloring layer 34 receives application of near ultraviolet rays of nearly 420 nm after thermal recording, the diazonium salt compound of the yellow coloring layer 34 is photochemically fixed and loses its color developability. Note that ultraviolet lamps for optical fixation are used but not shown in FIG. 2.

Operation of the thermal printer is described now. The image data read from the image memory 14 is adjusted through the color adjustor circuit 15 for the colors, and displayed in the CRT 28. With the simulated color checked visually, a printing key is depressed. The image data is converted by the thermal hysteresis compensator 16 from the eight bits to the nine bits. If the 8-bit image data after the second-order differential operation becomes under zero or over 255, it can be converted by the present invention into a value within the halftone level 0–511. Then the image data is input to the drive signal generator 18 through the decoder 17, to generate the head drive signal for the yellow recording.

A recording area of the recording sheet 23 is moved to the position under the thermal head 22. A yellow image starts being recorded. The head drive signal for one frame of the yellow color is supplied to the thermal head 22 one line after another, to drive the thermal head 22. In the yellow recording, the yellow image of highly sharp contrast can be recorded, without tailing due to thermal hysteresis of each of the heating elements. The yellow recorded portion is subjected to application of ultraviolet rays of a predetermined wavelength from the yellow fixing lamp, and fixed optically.

When the yellow recording and fixation are finished, the recording area of the recording sheet 23 is moved to the position under the thermal head 22. The magenta coloring layer 33 starts being heated for recording. The 8-bit image data of magenta is converted into 9-bit data in similar fashion to the yellow recording. The head drive signal according to this image data is supplied to the thermal head 22. In the magenta recording, a magenta image is recorded as sharply as the yellow image. The portion with the magenta recorded is subjected to ultraviolet rays from a magenta fixing lamp, and fixed optically. Then a cyan image is recorded. There is no operation of fixing the cyan image. The recording material is exited to an outside of the printer.

In the above embodiment, the color video printer is the direct thermal printing type in which the color thermosensitive recording sheet is heated to record. Also the present invention is applicable to any color video printers, including a color wax-transfer (melt-type) thermal printer in which a color thermosensitive ink sheet is used and which transfers ink to a recording paper, a color ink-jet printer in which a printing head has ink-jet nozzles for primary color ink, and a printer in which color recording material having photochemically colorable and thermally fixable characteristics is used and which optically records an image and fixes it with heat.

In the above, the 8-bit image data is converted to the 9 bits. The present invention is of course applicable to a video printer in which 16-bit image data is converted to 17 bits. In the above embodiment, the color video printer is a line printer. The present invention is applicable to a serial printer. The still video camera has recorded the still image to the magnetic disk in the above embodiment, but can have recorded it to an IC memory card. In the above embodiment, the video image is input from the magnetic disk to the video printer. Also a recording/playing video camera can be used for inputting a video image to the video printer. In the above embodiment, the thermal printer is a color video printer. The present invention is applicable to a monochromatic video printer. In the above, the 8-bit image data is converted to the 9 bits. The present invention is also applicable to a video printer in which the 8-bit image data is converted to 10 or more bits, by presetting an added number as 384 or the like instead of 128.

In the above embodiment, the brightness data Y and the chrominance data R-Y and B-Y are compensated. Alternatively color data of Yellow, Magenta and Cyan or Blue, Green and Red may be compensated.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A video printing method of printing a pixel to recording material in accordance with digital data, said digital data being quantized in K bits, where K is an integer, said video printing method comprising steps of:
   compensating said digital data by use of a second-order differential operator;
   adding N to said digital data being compensated, where N is an integer, and
   limiting a sum of N and said compensated digital data to a range of (K+L) bits, so as to heighten halftone of said pixel to be printed.

2. A video printing method as defined in claim 1, wherein said limiting step includes:
   if said sum of N and said compensated digital data is smaller than zero, setting zero in place of said sum; and
   if said sum is greater than $2^{K+L}-1$, setting $2^{K+L}-1$ in place of said sum.

3. A video printing method as defined in claim 2, wherein said compensated digital data g'(i, j) is determined in approximation by:

$$g'(i,j) = g(i,j) + \sum_{u,v} \{g(u,v) - g(i,j)\}$$

where g(i, j) is said digital data of said pixel to be compensated, and g(u, v) is digital data of each of plural pixels located about said pixel to be compensated.

4. A video printing method as defined in claim 3, wherein $N \geq 2^{K-1}$.

5. A video printing method as defined in claim 4, wherein said recording material includes a support and three thermosensitive coloring layers formed thereon and laid over one another, said coloring layers being heated respectively to develop yellow, magenta and cyan colors.

6. A video printing method as defined in claim 5, wherein said digital data includes brightness data and color difference data obtained by subjecting a color video signal to Y/C separation, decoding and A/D conversion, said brightness data and color difference data being treated in said compensating, adding and limiting steps.

7. A video printing method as defined in claim 6, wherein K=8 and L=1.

8. An image processing method of processing digital data input for a pixel, said digital data being quantized in a range of zero to M-1, where M is an integer, said image processing method comprising steps of:
   compensating said digital data by use of a second-order differential operator;
   adding N to said digital data being compensated, where N is an integer; and
   limiting a sum of N and said compensated digital data to a range of zero to M+2N-1, so as to heighten halftone of said pixel to be printed.

9. An image processing method as defined in claim 8, wherein said limiting step includes:
   if said sum of N and said compensated digital data is smaller than zero, setting zero in place of said sum; and
   if said sum is greater than M+2N-1, setting M+2N-1 in place of said sum.

10. An image processing method as defined in claim 9, wherein said compensated digital data g'(i, j) is determined in approximation by:

$$g'(i,j) = g(i,j) + \sum_{u,v} \{g(u,v) - g(i,j)\}$$

where g(i, j) is said digital data of said pixel to be compensated, and g(u, v) is digital data of each of plural pixels located about said pixel to be compensated.

11. An image processing method as defined in claim 10, wherein $N \geq M/2$.

12. An image processing method as defined in claim 11, wherein said digital data includes brightness data and color difference data obtained by subjecting a color video signal to Y/C separation, decoding and A/D conversion, said brightness data and color difference data being treated in said compensating, adding and limiting steps.

13. A video printer for printing a pixel to recording material in accordance with digital data, said digital data being quantized in K bits, where K is an integer, said video printer comprising:
   a second-order differential operation circuit for compensating said digital data by use of a second-order differential operator;

an adder for adding N to said digital data being compensated, where N is an integer; and a limiter for limiting a sum of N and said compensated digital data to a range of (K+L) bits, so as to heighten halftone of said pixel to be printed.

14. A video printer as defined in claim 13, wherein, if said sum of N and said compensated digital data is smaller than zero, then said limiter sets zero in place of said sum, and if said sum is greater than $2^{K+L}-1$, then said limiter sets $2^{K+L}-1$ in place of said sum.

15. A video printer as defined in claim 14, wherein said second-order differential operation circuit determines said compensated digital data g'(i, j) in approximation by:

$$g'(i,j) = g(i,j) + \sum_{u,v} \{g(u,v) - g(i,j)\}$$

where g(i, j) is said digital data of said pixel to be compensated, and g(u, v) is digital data of each of plural pixels located about said pixel to be compensated.

16. A video printer as defined in claim 15, wherein $N \geq 2^{K-1}$.

17. A video printer as defined in claim 16, wherein said recording material includes a support and three thermosensitive coloring layers formed thereon and laid over one another, said coloring layers being heated respectively to develop yellow, magenta and cyan colors.

18. A video printer as defined in claim 17, further comprising:

Y/C separation circuit for effecting Y/C separation of an input color video signal;

a decoder for decoding an output of said Y/C separation circuit, to output a brightness signal and color difference signals; and an A/D converter for effecting A/D conversion of said brightness signal and said color difference signals, to output said digital data inclusive of brightness data and color difference data to be input to said second-order differential operation circuit.

19. A video printer as defined in claim 18, wherein L=1.

20. An image processor for processing digital data input for a pixel, said digital data being quantized in a range of zero to M−1, where M is an integer, said image processor comprising:

a second order differential operator circuit for compensating said digital data using a second-order differential operator;

an adder which adds N to said digital data being compensated, where N is an integer; and a limiter which limits a sum of N and said compensated digital data to a range of zero to M+2N−1, so as to heighten halftone of said pixel to be printed.

21. The image processor as defined in claim 20, wherein, if said sum of N and said compensated digital data is smaller than zero, then said limiter sets zero in place of said sum, and if said sum is greater is than M+2N−1, then said limiter sets M+2N−1 in place of said sum.

22. The image processor as defined in claim 21, wherein said second order differential operation circuit determines said compensated digital data g'(i, j) in approximation by:

$$g'(i,j) = g(i,j) + \sum_{u,v} \{g(u,v) - g(i,j)\}$$

where g(i,j) is said digital data of said pixel to be compensated, and g(u, v) is digital data of each of plural pixels located about said pixel to be compensated.

23. The image processor as defined in claim 22, wherein $N \geq M/2$.

24. The image processor as defined in claim 23, wherein said digital data includes brightness data and color difference data obtained by subjecting a color video signal to Y/C separation, decoding and A/D conversion, said brightness data and color difference data being operated on by said second-order differential operator circuit, adder and limiter.

25. A video printing method as defined in claim 1, further comprising shifting the range of (K+L) bits such that a lower part of the range of (K+L) bits extends below a range of K bits and an upper part of the range of (K+L) bits extends above the range of K bits by setting N.

26. A video printing method as defined in claim 1, wherein $N=2^{k-1}$ thereby shifting the range of K bits to be in a middle of the range of (K+L) bits.

27. A video printer as defined in claim 13, wherein $N=2^{k-1}$, thereby shifting a range of K bits to a center of the range of (K+L) bits.

* * * * *